Oct. 7, 1958    H. D. KUESTER ET AL    2,854,933
PLANTING DEVICE

Filed Feb. 4, 1957    3 Sheets-Sheet 1

Inventors
Harlan D. Kuester
George E. Inkess
By
Stevens, Davis, Miller & Mosher
their Attorneys

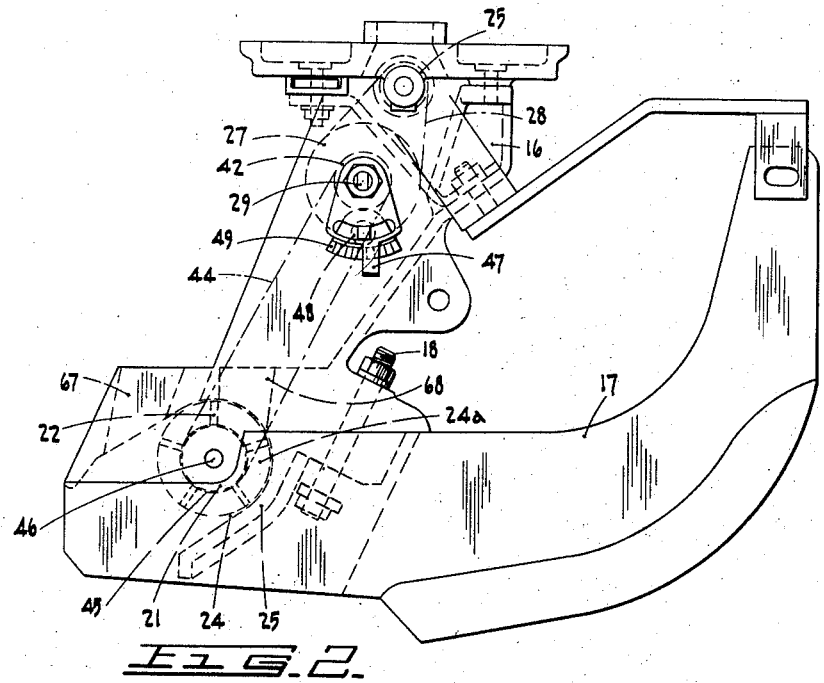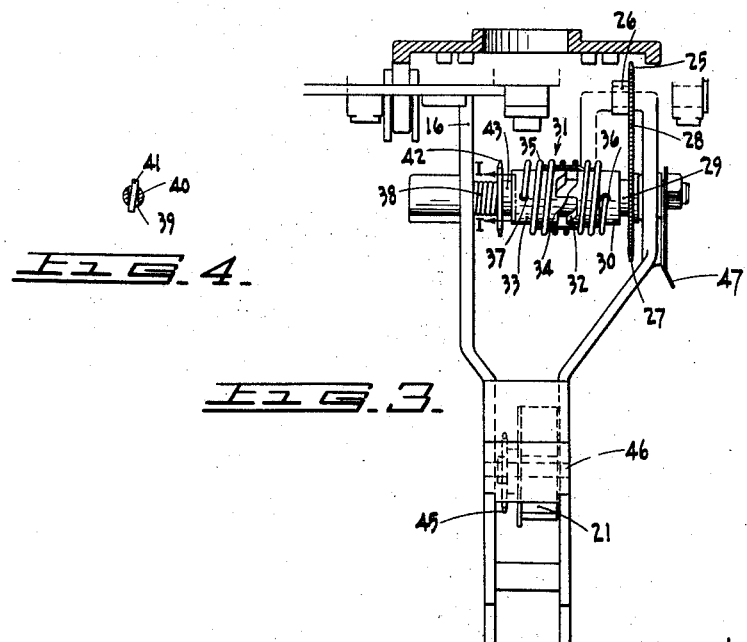

Oct. 7, 1958

H. D. KUESTER ET AL 2,854,933

PLANTING DEVICE

Filed Feb. 4, 1957

Inventors
Harlan D. Kuester
George E. Tinkess
By
Stevens, Davis, Miller & Mosh
their Attorneys

United States Patent Office 2,854,933
Patented Oct. 7, 1958

2,854,933
PLANTING DEVICE

Harlan D. Kuester and George E. Tinkess, Brantford, Ontario, Canada, assignors to Cockshutt Farm Equipment Limited, Brantford, Ontario, Canada, a corporation of Canada Application February 4, 1957, Serial No. 637,964

1 Claim. (Cl. 111—34)

This invention relates to an improved device for planting seeds.

It is sometimes desirable to plant seed by drilling the seed in a continuous and regular manner. Under other circumstances, it is desired to plant the seed in such a manner that several seeds are covered together in a tight cluster so that several plants grow together to form a "hill." Where hill planting is desired, the previous practice has been to use flapper valves at the bottom of the seed spouts. These, however, suffer from the disadvantage of being unsuitable for high speed of operation. In addition, the seeds released by the flapper valve tend to spread out because some of the seeds have been retained by the flapper valve for a sufficient length of time to become de-energized, whereas others of the seeds are still energized, and also because the flapper valve merely allows the seeds to drop without imparting an impulse with the consequence that there is no compensation for the potential energy imparted to the seeds by the forward movement of the planter.

An object of this invention is to provide a structure which can readily be adjusted for planting the seeds in a regular manner or in the form of hills and which is suitable for high speed operation.

A further object of this invention is to provide an improved device for planting seeds in the form of hills and which overcomes the foregoing disadvantage.

The manner in which this is accomplished in accordance with this invention will be apparent from the description which follows of the preferred embodiments of this invention. The scope of this invention will appear from the appended claim.

In the drawings illustrating the preferred embodiments of this invention:

Figure 2 is a view similar to Figure 1 but showing the drive mechanism used in hill planting.

Figure 3 is an end elevation view of the structure shown in Figure 2.

Figure 4 is a section view on the line I—I of Figure 3.

Figure 1:
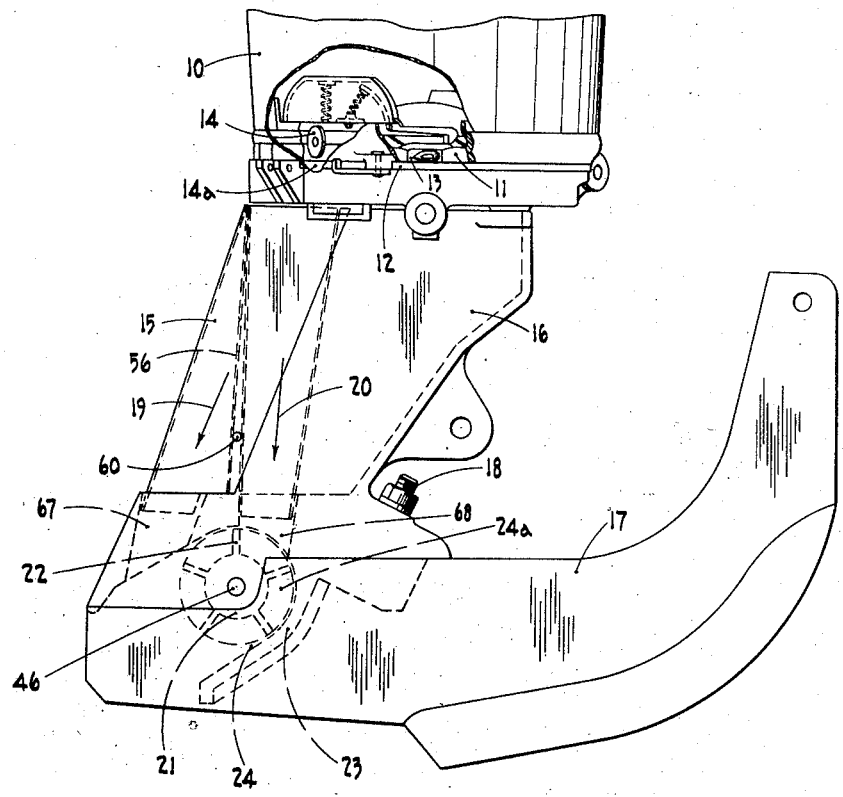
Figure 1 is a partly cut away sectional elevation view of a planter showing the path taken by the seed.

Referring now to Figure 1 of the drawings, the seeds are carried in a seed hopper 10 which has a seed plate 11 mounted plate ring 12, seed plate has cells 13 for accommodating individual seeds. A knocker 14 expels the seed from cells 13 through an aperture 14a into a seed spout 15. The seed plate and knocker are not shown in detail as these are a conventional mechanism. Seed hopper 15 is mounted on a supporting housing 16 which also acts to support a furrowing device 17 which is bolted to housing 16 by bolt 18, and which acts to open up the ground for the planting of the seeds. Seed spout 15 is adapted to drill seeds expelled by the knocker directly to the ground along a rearwardly and downwardly directed path indicated by arrow 19, or alternatively, to direct the seeds along a downwardly directed path indicated by the arrow 20 to an intermittently moving rotary valve 21. In the latter case, the seeds are deposited between blades 22 of rotary valve 21. Housing 16 is shaped to provide a guide portion 23 which conforms to the shape of rotary valve 21 so as to retain the seeds between blades 22 until an ejection point 24 is reached. The intermittent movement of rotary valve 21 positively impels the seeds in a downwardly and rearwardly directed path, compensating for the forward movement of the planter. As a consequence the seeds fall dead and have little tendency to roll along the ground.

Referring now to Figures 2 and 3 of the drawings, the drive for rotary valve 21 is provided by a sprocket wheel 25 which is driven by the drive shaft 26 and which drives a sprocket wheel 27 through sprocket chain 28. Sprocket chain 28 is rotatably mounted on a stationary countershaft 29 and is coupled to the primary section 30 of an impulse coupler indicated generally by the numeral 31. Impulse coupler 31 comprises primary section 30 having a cam face 32 at one end thereof and a secondary section 33 having a cam face 34 cooperating with cam face 32. A torsion spring 35 is anchored to primary section 30 at 36 and to secondary section 33 at 37. A compression spring 38 acts between housing 16 and secondary section 33 to urge secondary section 33 towards primary section 30. The secondary section 33 is initially prevented from rotating due to engagement with a pin 41 (shown in Figure 4) which is located in a slot 39 at the midsection portion 40 of countershaft 29. However, as primary section 30 rotates, cam faces 32 and 34 work together to move secondary section 33 away from primary section 30, against the influence of spring 38, to disengage secondary section 33 from pin 41, thus permitting secondary section 33 to rotate. Torsion spring 35, which is preloaded and additionally stressed by the rotation of the primary section 30, causes the secondary section 33 rapidly to rotate as soon as section 33 is disengaged from pin 41. The rotation of the secondary section 33 continues for a quarter turn, at which point cam face 34 will again be in registration with pin 41 permitting secondary section 33 to return to its initial position. Compression spring 38 acts to return the secondary section 33. The cycle described above is then repeated.

It will be appreciated that the impulse coupler thus provided provides an intermittent movement of secondary section 33. Sprocket wheel 42 is coupled by connecting sleeve 43 to secondary section 33. Sprocket wheel 42 drives a sprocket chain 44 which in turn drives a sprocket wheel 45 mounted on the shaft 46 of rotary valve 21. Thus the impulse coupler 31 causes rotary valve 21 to remain stationary while it receives a supply of seeds between a pair of blades 22 and then to be rotated rapidly to an intermediate position indicated at 24a where the seeds are de-energized by being retained in a dead area for the period of one impulse. The next impulse of the impulse coupler 31 transfers the seeds to the position indicated at 24 to plant the seeds, collected between a pair of blades 22, in the form of a hill. The movement towards position 24 gives an impulse to the seeds causing them to be projected rearwardly and downwardly. The pause at position 24 insures that all of the seeds are expelled.

The timing between the impulse coupler 31 and rotary valve 21 is readily controlled by means of an adjustment provided by a lever 47 which is locked by bolt 48 at a desired position with respect to scale 49. Lever 47 is coupled to countershaft 29. Accordingly, movement of lever 47 changes the orientation of pin 41 in countershaft 29.

The seed spout is shown in detail in Figures 5, 5a, 5b, 6 and 7. Seed spout 15 comprises a housing provided by side walls 50 and 51 and end walls 52 and 53. Side wall 50 is sloped towards side wall 51 to give an outlet aperture 54 which is narrower than inlet aperture 55. A partition member 56 is provided by a pair of plates 57 and 58 respectively, welded together at upper end 59 and mounted near their lower ends on shaft 60. Shaft 60 is journalled in apertures 61 and 62 in side walls 50 and 51 respectively and is bent to provide a lever portion 63. Bracket 64 has flange portions 65 and 66 which provide catches to retain lever 63 in a position in which partition member 56 is in either hill drop position or drill position. Lever 63 is resilient and can be biased outwardly sufficiently to ride over flanges 65 and 66.

Figure 7:
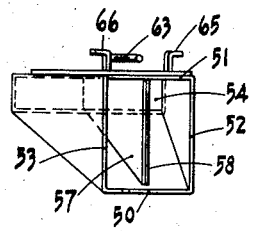
Figure 7 is a plan view of Figure 5.
Figure 6:
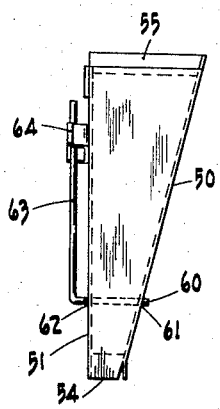
Figure 6 is an end elevation view corresponding to Figure 5.
Figure 5:
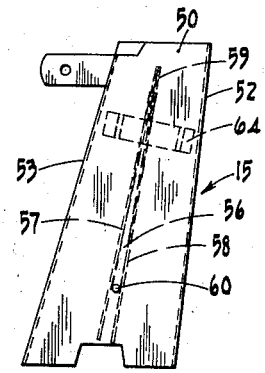
Figures 5, 5a and 5b are a detailed side elevation view of a seed spout component of the structure shown in Figures 1, 2 and 3.

Figures 5, 6, and 7, show partition member 56 in an intermediate position for clarity of illustration.

Figure 5A:
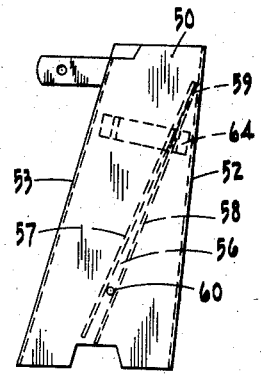

Figure 5a shows partition member 56 in drilling position.

Figure 5B:
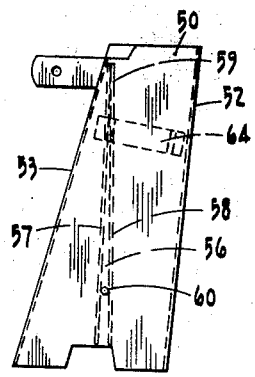

Figure 5b shows partition member 56 in hill drop position.

When partition member 56 is in the position shown in Figure 5a, it directs the seeds through opening 67 in housing 16 directly into the soil whereas when partition member 56 is in the position shown in Figure 5b, it directs the seed through an opening 68 in housing 16, into the space between blades 22 on rotary valve 21.

We claim:

In a seed planter, a housing, a rotary valve mounted in said housing to rotate about a generally horizontal axis for accumulating a predetermined quantity of seeds continuously supplied to said rotary valve and for discharging said predetermined quantity of seeds on to the ground, said rotary valve including means defining a plurality of seed receiving pockets, each of said pockets being adapted to contain said predetermined quantity of seeds, means including an impulse coupler for rotating said rotary valve so as successively to maintain each of said seed receiving pockets stationary in a seed reception position to receive said predetermined quantity of seeds, to move said seed receiving pocket to a seed de-energization position, to maintain said seed receiving pocket stationary at said de-energization position, and to move said seed receiving pocket to a seed discharge position at which said predetermined quantity of seed is positively discharged from said seed receiving pocket in a downwardly and rearwardly directed path and to maintain said seed receiving pocket stationary at the discharge position so as fully to discharge the seeds from said seed receiving pocket, said impulse coupler being mounted in said housing and comprising a primary section operably connected to means for driving said impulse coupler, a secondary section, driven by said primary section, said secondary section being operably connected to drive said rotary valve, cam means on each of said primary and secondary sections cooperating with each other to move said primary and secondary sections away from each other upon rotation of said primary section and to allow said primary and secondary sections to return towards each other upon the completion of a predetermined rotation of said primary section, means engageable with said secondary section preventing said secondary section from rotating when said secondary section is returned towards said primary section while being disengageable to permit rotation of said secondary section when said secondary section is moved away from said primary section, means acting on at least one of said primary and secondary sections to move said primary and secondary sections together and means acting on said secondary section to rotate said secondary section in the direction of rotation of said primary section upon the disengagement of said means preventing said secondary section from rotating.

References Cited in the file of this patent

UNITED STATES PATENTS

| | | |
|---|---|---|
| 1,217,780 | Kone | Feb. 27, 1917 |
| 1,751,590 | Lutz | Mar. 25, 1930 |